2,943,951
FLAME SPRAYING METHOD AND COMPOSITION

John Helge Haglund, Hallstahammar, Sweden, assignor to Aktiebolaget Kanthal, Hallstahammar, Sweden, a corporation of Sweden No Drawing. Filed Mar. 18, 1957, Ser. No. 646,536

Claims priority, application Sweden Mar. 23, 1956

17 Claims. (Cl. 117—22)

This invention relates to flame spray coating fused or partly fused solids onto a surface for protection of the latter or onto the surface of a ceramic body to produce an electric resistor coating thereon or other purposes.

Flame spraying may be effected by projecting a spray of solid metal particles through an oxygen-acetylene flame which fuses or partly fuses the particles. Further, the solid particles may be mixed with particles of iron oxide and aluminum, for example, which react exothermically. However, protection of the surface, normally metallic, against oxidation at high temperatures or the operation of the electric resistor at high temperatures requires the use of highly refractory compounds which inherently involve problems in connection with their application by flame spraying.

The present invention has for its object to utilize flame spraying to apply a coating largely comprising molybdenum disilicide, $MoSi_2$, and if desired one or more of the other highly refractory silicides of the transition metals of groups IV, V and VI [titanium, zirconium, hafnium, vanadium, niobium (or colombium), tantalum, chromium, tungsten], such as, for example, chromium and titanium disilicides, and also silicon carbide.

According to the present invention the individual powder particles of such silicon containing refractories coated with an oxide film of silicon dioxide are mixed with powder particles of a metal, for instance aluminium or magnesium, which has a strongly positive heat of reaction with oxygen in comparison with that of silicon. It should be observed that said silica film is formed already at normal room temperature by the action of the atmosphere as is the case in all base metals. At higher temperatures, such as in flame spraying, the thickness of the silica film will increase. In any case, no special measures need to be taken to coat said powder particles with a silica film.

In the course of the reaction taking place during flame spraying, the oxide film will be reduced whereby good sintering together of the particles sprayed onto the surface will result. The reaction between aluminium and silicon dioxide is exothermic in nature which means that heat will be given off, and the silicon and aluminium oxide formed will be present in a nascent state all of which will highly enhance the sintering together of the surface coating on the object treated. The course of the process described can be further amplified by the addition of a readily reducible pulverulent oxide such as nickel oxide or cobalt oxide both of which have been found to be particularly suitable. This action depends thereon that said oxides give an intense reaction heat with aluminium whereby the reaction products adhering to the surface show an increased superficial activity. The sintering together is thereby facilitated also in respect of the silicon containing products.

When comparing flame spraying with aluminium and iron oxide, and flame spraying with aluminium and silicon dioxide the following points should be considered:

In alumino-thermic reaction processes the heat energy produced is directly related to the heat of formation of the oxides taking part in the process. In the case of reacting aluminium with iron oxide more than twice as many calories are obtained as in the case of silicon dioxide, which in part explains the fact that silicon dioxide and aluminium will not spontaneously react alumino-thermically with each other upon ignition. However, such a reaction, once started, can be sustained by continuously maintaining the temperature at an elevated point by artificial means, such as by flame spraying.

The reaction involving silicon dioxide further distinguishes from that involving iron oxide by the fact that silicon will form a lower oxide (silicon monoxide, SiO), having a boiling point of 1880° C. When reducing silicon dioxide this silicon monoxide may be formed, and when the temperature is about 1880° C. and higher, substantial portions of the silicon dioxide may escape in the form of gasified silicon monoxide, SiO.

Now to enable flame spraying of molybdenum disilicide to be carried out, the temperature must be raised to a point at which the powder particles are fused or, at least, softened so as to be formable, which corresponds to a temperature of about 2030° C. Owing to this elevated temperature at which the alumino-thermic reaction will be sustained, removal of the surface film of silicon dioxide is effected by reduction and/or vaporization whereby exposed clean metallic surfaces are obtained which is a condition required for a satisfactory sintering together of the flame sprayed silicide coating.

The practical applicability of the present invention is illustrated by the following examples, the proportions cited being by weight:

Example 1

A mixture of 92% $MoSi_2$, the granular particles of which are coated with a film of $SiO_2$ and are of grain sizes ranging between 5 and 10 micra, 5% Al having a grain size of about 40 micra, and 3% cobalt oxide, is mixed with 15+% polyethene and is extruded into a string 1/8 inch in thickness. Such string is excellently adapted for flame spraying using a conventional spray gun and using acetylene and oxygen gas as fuel. Such fuel may be adjusted to give temperatures about the 2030° C. noted above.

Example 2

In a pulverulent mixture of 90% $MoSi_2$, 7% of an aluminium-magnesium alloy (50% Al, 50% Mg) and 3% $TaSi_2$, the silicide grains are coated in advance with a film of $SiO_2$. The mixture is subjected to sintering in an atmosphere of hydrogen gas at 1200° C. into a structurally uniform product which is then crushed in a ball mill into an average grain size of 20 micra. This powdered mixture is suitable for flame spraying using any equipment adapted for the relevant purpose.

Example 3

For admixing into polyethene for flame spraying purposes as described in connection with Example 1, the following pulverulent mixture is used: 60% $MoSi_2$, 20% $CrSi_2$, 10% SiC, 8% Al and 2% ferroboron (11% B), the silicide and carbide grains being coated in advance with a film of $SiO_2$.

In the pulverulent mixture, according to the present invention, the grain size of the silicide or silicides is 50 micra or less, preferably 15 micra or less, and the content of aluminum powder is 1 to 10 percent by weight, preferably 2 to 6 percent by weight, of the powder mixture, its grain size ranging between 10 and 150 micra, preferably between 40 and 70 micra.

It has been found by experiments that the amount and grain size of the aluminum powder has a critical influence on the result obtained by the flame spraying operation. An addition of between 2 and 6% Al will act to minimize the oxide content of the coating obtained, which oxide corresponds to 0 to 5 percent by weight. If the aluminum addition be taken substantially less than 2% or essentially in excess of 6%, the oxide content of the coating will be increased to between 5 and 20%. As a mather of fact, if the aluminum content is less than 2% the coating will have silicon dioxide included into it, and if on the other hand, the aluminum content exceeds 6%, the coating will instead have aluminum oxide included into it. However, with an addition of 1 to 10% aluminum it is possible, as a rule, to obtain fairly satisfactory results.

It is of advantage to have as low as possible an oxide content in the coating, since a high content of oxides will reduce the imperviousness of the coating and will thereby give rise to an intensified oxidation, especially at elevated temperatures. In addition, the mechanical strength of the coating will, as a rule, be lower if the oxide content is high.

The major portion of the aluminum powder added to the mixture will oxidize during the spraying operation and will form an oxide which is blown off as a loss. However, a small proportion of the oxide may remain in the coating. Its content of metallic aluminum will be very low, usually lower than 1%.

As regards the grain size of the aluminum powder, it has been found that grain sizes of 40 to 70 micra will give good results with only a slight oxide content in the coating, whereas aluminum powder having a grain size of 1 to 2 micra will cause substantial oxidation of the surface coating, which would be due to the fact that such finely grained aluminum powder is substantially oxidized even in its initial condition. In any case, the aluminum powder should be coarser than 10 micra but finer than 150 micra.

The grain size of the silicide powder should be related in a determined manner to the quantity of the aluminum powder, in that coarse silicide particles call for less aluminum quantity, it being understood that the coarser are the solid grains the relatively less is the quantity of $SiO_2$ which means that a less quantity of aluminum is consumed. The grain size of the silicide used should suitably be approximately 15 micra or less, and in any case less than 50 micra. The statement of a grain size of 15 micra or less should be considered to mean that 90% by weight of the material have a grain size less than 15 micra.

When flame spraying a pulverulent silicide without the addition of a strongly positive metal, or a metal which combines actively with oxygen, the spray losses will be very great. This condition would be explained by the fact that in this case the surfaces of the silicide particles will be coated with a layer of silicon dioxide, or any such pre-existent layer will be thickened, which will prevent adhesion of the particles so that the latter will instead be blown off and get lost. If, on the other hand, aluminum powder is added, it is believed that the silicon dioxide will be reduced into silicon monoxide SiO, which is volatile and thus will volatilize whereby the silicide surface will be metallic and more prone to facilitate the sintering together. However, this less of silicon monoxide implies a lowering of the silicon content of the silicide. When spraying tungsten and molybdenum silicides the highly volatile oxides $MoO_3$ and $WO_3$ will boil off but to a less extent than would be required in order to compensate for the loss in silicon. Therefore, also when using molybdenum and tungsten silicides, the flame sprayed coating will be found to have a silicon content which is lower than that of the raw materials.

When flame spraying a mixture of molybdenum disilicide plus 3% aluminum powder the loss in silicon involved will be of such a magnitude that the composition of the coating will correspond to the formula $MoSi_{1.2}$. This composition corresponds to the eutectic between the compounds $MoSi_2$ and $Mo_5Si_3$. The losses of molybdenum trioxide and silicon monoxide involved in such an experiment means that the total recovery will amount to no more than 30% of the theoretically possible value. However, if aluminum powder should not be added, the recovery would be very much reduced and would only amount to 4 to 6%. If the powdered mixture contains a silicon content lower than that corresponding to the formula $MoSi_2$, then the silicon content of the coating obtained will be still lower than in the initial materials, and at the same time a certain amount of $Mo_3Si$ will form. Since the resistance to oxidation of this silicide is materially lower than that of the other two molybdenum silicides, the resistance to oxidation of the coating at elevated temperatures will be low.

*Example 4*

For admixing into polyethene for flame spraying purposes as described in connection with Example 1, the following pulverulent mixture is used: 97% molybdenum silicide composed by 45% Si and 55% Mo and having grain sizes less than 10 micra, and 3% aluminum with finer grains than 325 United States mesh.

The higher Si content in the silicide in this example has for its purpose to compensate for the Si losses in the spraying. The composition of the coating obtained is nearly pure $MoSi_2$ (i.e. 37% Si and 63% Mo) and $Al_2O_3$ and a small amount of oxide.

What is claimed is:

1. A composition for flame spraying on a surface to apply a coating largely comprising a silicide of molybdenum, said composition including a refractory component comprising at least one compound selected from the group consisting of refractory silicon compounds of the transition metals of the fourth, fifth and sixth groups of the periodic table and carbon, said refractory component at least largely comprising a silicide of molybdenum and being in the form of powder particles which when exposed to the atmosphere automatically form coating films of silicon dioxide interfering with their adhesion together; and a metallic component in the form of powder particles of a metal having a strongly positive heat of reaction with oxygen in comparison with that of silicon and which is effective at flame spraying temperatures at least softening said silicide to reduce said silicon dioxide films and expose clean surfaces for adhesion together of said refractory component powder particles, said component powder particles being intermixed.

2. The composition of claim 1 in which said silicide of molybdenum of said refractory component has a higher content of silicon than the desired silicon content of the flame sprayed coating.

3. The composition of claim 2 in which said metal comprises aluminum.

4. The composition of claim 2 in which said metal comprises aluminum and constitutes from 1 to 10% by weight of the mixture of said components.

5. The composition of claim 2 in which said refractory component has a grain size not greater than 50 microns and said metallic component has a grain size ranging between 10 and 150 micra.

6. The composition of claim 1 in which said refractory component also comprises a silicide of tungsten and it and said silicide of molybdenum of said refractory component have higher silicon contents than the desired silicon content of the flame sprayed coating.

7. The composition of claim 6 in which said metal comprises aluminum.

8. The composition of claim 6 in which said metal comprises aluminum and constitutes from 1 to 10% by weight of said components.

9. The composition of claim 6 in which said refractory component has a grain size not greater than 50 micra and said metallic component has a grain size ranging between 10 and 150 micra.

10. The composition of claim 1 in which said metal comprises aluminum.

11. The composition of claim 1 in which said metal comprises aluminum and constitutes from 1 to 10% by weight of the mixture of said components.

12. The composition of claim 1 in which said refractory component has a grain size not greater than 50 micra and said metallic component has a grain size ranging between 10 and 150 micra.

13. The composition of claim 1 in which said silicide is composed of 45% silicon and 55% molybdenum and has a grain size less than 10 micra and said metallic component is composed of aluminum with finer grains than 325 United States mesh, said silicide constituting 97% of said mixture of components and said aluminum constituting substantially the balance thereof, said mixture of components being admixed into a carrier medium destructible at flame coating temperatures.

14. The composition of claim 13 in which said medium comprises polyethylene and is extruded to form a string suitable for flame spraying equipment.

15. A composition for flame spraying as defined in claim 1, wherein said composition is in sintered and pulverized form.

16. A process for flame spraying on a surface a coating largely comprising a silicide of molybdenum, said process including flame spraying on said surface a composition including a refractory component comprising at least one compound selected from the group consisting of refractory silicon compounds of the transition metals of the fourth, fifth and sixth groups of the periodic table and carbon, said refractory component at least largely comprising a silicide of molybdenum and being in the form of powder particles which when exposed to the atmosphere automatically form thereon coating films of silicon dioxide interfering with their adhesion together, said composition further including a metallic component in the form of powder particles of a metal having a strongly positive heat of reaction with oxygen as compared to that of silicon, said components being intermixed and said composition being heated to temperatures at least softening said silicide during said flame spraying and said metal being effective at said temperatures to reduce said silicon dioxide films and expose clean surfaces on said refractory component particles which adhere together on said surface, said composition being heated during said flame spraying by means adding to the heat of reaction produced by said reduction of said films as required to maintain said reaction and said temperatures.

17. The process of claim 16 in which said components are admixed with a heat destructible carrier medium facilitating their handling by flame spray equipment, said medium being destroyed by the heating to said temperatures.

References Cited in the file of this patent

UNITED STATES PATENTS

| | | |
|---|---|---|
| 968,350 | Harrison | Aug. 23, 1910 |
| 2,173,484 | Larch et al. | Sept. 19, 1939 |
| 2,496,971 | Wiczer | Feb. 7, 1950 |
| 2,714,563 | Poorman et al. | Aug. 2, 1955 |
| 2,775,531 | Montgomery et al. | Dec. 25, 1956 |
| 2,788,290 | Double | Apr. 9, 1957 |

FOREIGN PATENTS

| | | |
|---|---|---|
| 591,880 | Great Britain | Sept. 1, 1947 |
| 621,244 | Great Britain | Apr. 6, 1949 |